US 10,970,885 B2

(12) United States Patent
Ahn et al.

(10) Patent No.: US 10,970,885 B2
(45) Date of Patent: Apr. 6, 2021

(54) ITERATIVE IMAGE RECONSTRUCTION

(71) Applicant: General Electric Company, Schenectady, NY (US)

(72) Inventors: Sangtae Ahn, Guilderland, NY (US); Bruno Kristiaan Bernard De Man, Clifton Park, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 91 days.

(21) Appl. No.: 16/528,329

(22) Filed: Jul. 31, 2019

(65) Prior Publication Data
US 2021/0035339 A1     Feb. 4, 2021

(51) Int. Cl.
| | | |
|---|---|---|
| *G06K 9/00* | (2006.01) | |
| *G06T 11/00* | (2006.01) | |
| *G06T 7/00* | (2017.01) | |
| *G06N 3/08* | (2006.01) | |

(52) U.S. Cl.
CPC .............. *G06T 11/006* (2013.01); *G06N 3/08* (2013.01); *G06T 7/0012* (2013.01); *G06T 2207/20081* (2013.01); *G06T 2211/424* (2013.01)

(58) Field of Classification Search
None
See application file for complete search history.

(56) References Cited

U.S. PATENT DOCUMENTS

| | | |
|---|---|---|
| 2018/0197317 A1 | 7/2018 | Cheng et al. |
| 2018/0293762 A1 | 10/2018 | Fu et al. |
| 2019/0059780 A1 | 2/2019 | Lee et al. |

FOREIGN PATENT DOCUMENTS

| | | |
|---|---|---|
| CN | 107481297 A | 12/2017 |
| CN | 108717717 A | 10/2018 |
| WO | 2017223560 A1 | 12/2017 |
| WO | 2018236748 A1 | 12/2018 |

OTHER PUBLICATIONS

Jin, Kyong, et al.; "Deep Convolutional Neural Network for Inverse Problems in Imaging", IEEE Transactions on Image Processing, vol. 26, Issue: 09, pp. 4509-4522, Sep. 2017.
Gupta, Harshit, et al.; "CNN-Based Projected Gradient Descent for Consistent CT Image Reconstruction", IEEE Transactions on Medical Imaging, vol. 37, Issue: 06, pp. 1440-1453, May 3, 2018.
Qin, Chen, et al.; "Convolutional Recurrent Neural Networks for Dynamic MR Image Reconstruction", IEEE Transactions on Medical Imaging, vol. 38, Issue: 01, pp. 280-290, Aug. 6, 2018.

*Primary Examiner* — Atiba O Fitzpatrick
(74) *Attorney, Agent, or Firm* — Fletcher Yoder, P.C.

(57) ABSTRACT

The present disclosure relates to performing an unrolled iterative reconstruction of image data. Such approaches may include use of neural networks used for one or both of data fidelity and/or image update steps, resulting in improved image quality and accelerated reconstruction for various imaging modalities including CT, PET and MR.

21 Claims, 6 Drawing Sheets

ITERATIVE IMAGE RECONSTRUCTION

TECHNICAL FIELD

The subject matter disclosed herein relates to iterative reconstruction of images using non-invasively acquired scan data.

BACKGROUND

Non-invasive imaging technologies allow images of the internal structures or features of a patient/object to be obtained without performing an invasive procedure on the patient/object. In particular, such non-invasive imaging technologies rely on various physical principles (such as the differential transmission of X-rays through a target volume, the reflection of acoustic waves within the volume, the paramagnetic properties of different tissues and materials within the volume, the breakdown of targeted radionuclides within the body, and so forth) to acquire data and to construct images or otherwise represent the observed internal features of the patient/object.

Reconstruction of images using non-invasively acquired scan data may be performed using various types of reconstruction processes and routines. All reconstruction processes and routines are subject to various trade-offs, such as between computational efficiency, patient dose, scanning speed, image quality, and artifacts.

In certain imaging contexts, iterative reconstruction techniques may be employed as part of the image reconstruction process. Iterative image reconstruction may be employed in computed tomography (CT), positron emission tomography (PET), single-photon emission computed tomography (SPECT), ultrasound-based imaging, and magnetic resonance imaging (MR or MM) in medical contexts as examples where an iterative solution is applied to an inverse problem. Such solutions, however, may suffer from relatively lengthy (e.g., long compute time) image reconstruction and may also have poor image quality that manifest as image noise, insufficient contrast-to-noise ratio, insufficient spatial resolution, insufficient quantitative accuracy, and/or poor detectability in reconstructed images.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible embodiments. Indeed, the invention may encompass a variety of forms that may be similar to or different from the embodiments set forth below.

In one embodiment, a method is provided for reconstructing an image. In accordance with one implementation, scan data input is received from a scan device. The scan data input is processed to generate a final reconstructed image using a sequence of processing steps. Each processing step comprises: applying a forward model to an input image provided as an input to the respective processing step to generate calculated data; providing the calculated data and measured data as inputs to a data fidelity calculator that outputs an error term; backtransforming the error term to generate an image domain error term; and providing at least the image domain error term and the input image as inputs to an image update neural network to generate a next reconstructed image as input to a next processing step.

In a further embodiment, an imaging system is provided. In accordance with this embodiment, the imaging system comprises: a memory encoding processor-executable routines; and a processing component configured to access the memory and execute the processor-executable routines. The routines, when executed by the processing component, cause the processing component to process scan data generated by the imaging system to generate a final reconstructed image using a sequence of processing steps. Each processing step comprises: applying a forward model to an input image provided as an input to the respective processing step to generate calculated data; providing the calculated data and measured data as inputs to a data fidelity neural network trained to output an error term; backtransforming the error term to generate an image domain error term; and providing at least the image domain error term and the input image as inputs to an image update neural network to generate a next reconstructed image as input to a next processing step.

In an additional embodiment, a method is provided for reconstructing an image. In accordance with one implementation, scan data input is received from a scan device. The scan data input is processed to generate a final reconstructed image using a sequence of processing steps. Each processing step comprises: applying a forward model to an input image provided as an input to the respective processing step to generate calculated data; providing the calculated data and measured data as inputs to a data fidelity neural network trained to output an error term; backtransforming the error term to generate an image domain error term; and providing at least the image domain error term and the input image as inputs to an image update routine to generate a next reconstructed image as input to a next processing step.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
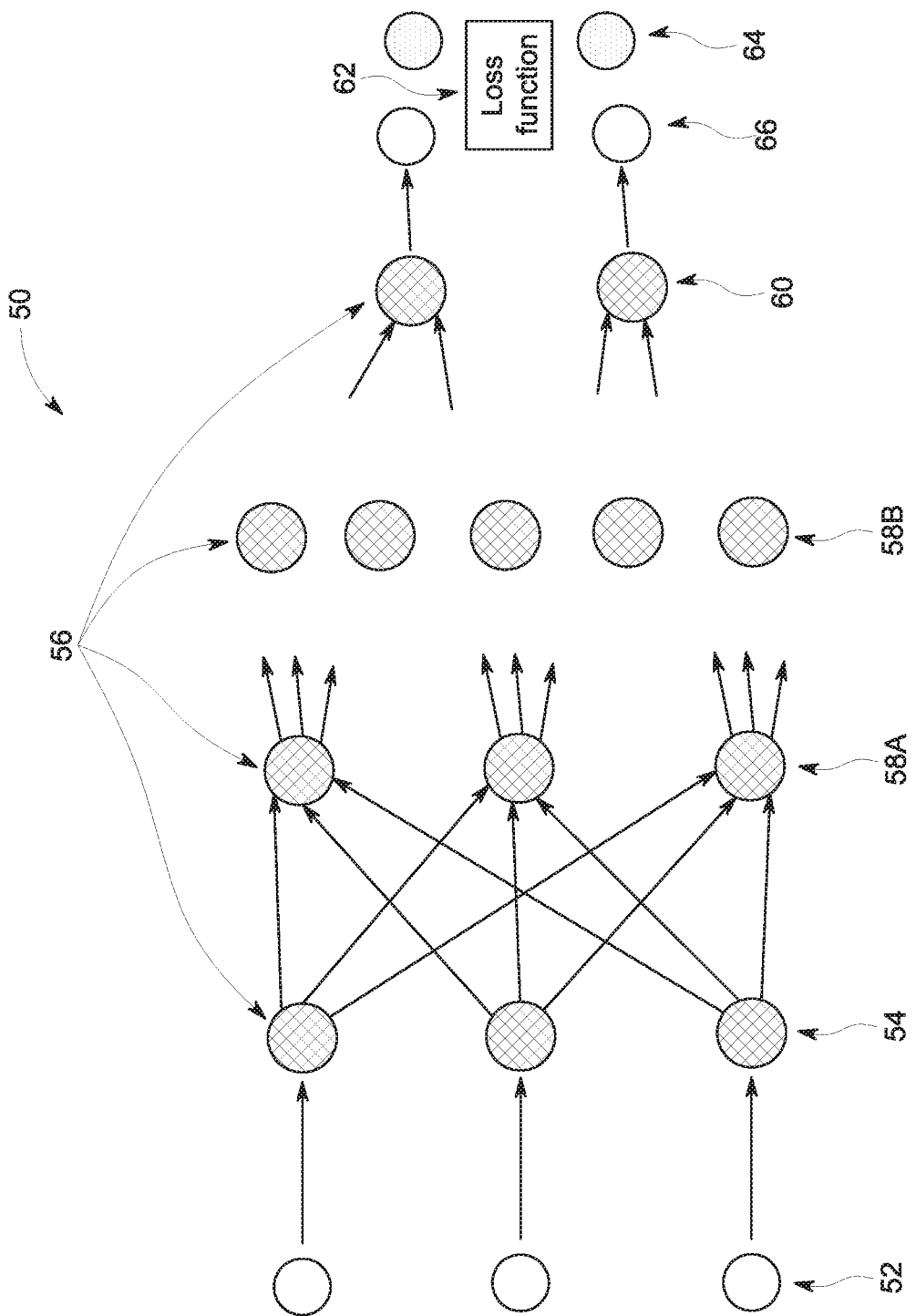
FIG. 1 depicts an example of an artificial neural network for training a deep learning model, in accordance with aspects of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While aspects of the following discussion are provided in the context of medical imaging, it should be appreciated that the disclosed techniques are not limited to such medical contexts. Indeed, the provision of examples and explanations in such a medical context is only to facilitate explanation by providing instances of real-world implementations and applications. However, the disclosed techniques may also be utilized in other contexts, such as iterative tomographic image reconstruction for industrial Computed Tomography (CT) used in non-destructive inspection of manufactured parts or goods (i.e., quality control or quality review applications), and/or the non-invasive inspection of packages, boxes, luggage, and so forth (i.e., security or screening applications). In general, the present disclosure may be useful in any imaging or screening context or image processing field where a set or type of acquired data undergoes an iterative reconstruction process to generate an image or volume.

Furthermore, while the following discussion focuses on standard images or image volumes, it should be understood that the same approach can also be applied to sets of images or image volumes corresponding to different aspects of the scan. For example, spectral CT produces a set of images, including images representative of different energies as well as basis material decomposition images. Or as another example, dynamic CT or PET produces a set of images at different time points. The current invention may be applied to these sets or types of images as well as others.

Further, though CT and C-arm examples are primarily provided herein, it should be understood that the disclosed technique may be used in other imaging modality contexts where iterative tomographic reconstruction processes are employed. For instance, the presently described approach may also be employed on data acquired by other types of tomographic scanners including, but not limited to, positron emission tomography (PET) scanners, single photon emission computed tomography (SPECT) scanners, ultrasound-based imagers, and/or magnetic resonance imaging (MRI) scanners.

By way of example, several imaging modalities, such as X-ray CT (e.g., multi-slice CT) and X-ray C-arm systems (e.g., cone-beam CT), measure projections of the object or patient being scanned where the projections, depending on the technique, correspond to Radon transform data, fan-beam transform data, cone-beam transform data, or non-uniform Fourier transforms. In other contexts, the scan data may be emission type data (e.g., PET or SPECT data) or magnetic resonance data (e.g., MM data) generated in response to magnetic fields and RF pulses. Iterative tomographic reconstruction routines and related correction and calibration routines are employed in conjunction with these imaging modalities to generate useful cross-sectional images or volumetric images from raw measurements.

Conventional reconstruction techniques typically use reconstruction routines that can either be characterized as direct reconstruction (which execute an explicit inversion step) or as optimization-based reconstruction (which iteratively optimize a cost function). Direct reconstruction approaches are relatively fast but lack an efficient way to suppress noise and certain artifacts. Optimization-based reconstruction approaches offer improved noise reduction and can incorporate physics effects in the forward model that are not easily inverted analytically, but such approaches are relatively computationally expensive.

As discussed herein, the present disclosure relates to image reconstruction with favorable properties in terms of noise reduction, spatial resolution, detail preservation and computational complexity and speed. In particular, as discussed herein, the present disclosure relate to the use of iterative image reconstruction routines that may be used to solve or address inverse problems and that may take the form of: beginning with an estimated solution, applying a forward model to the estimated solution, comparing the resulting computed output to the actual measurement, and transforming any residual error (data mismatch) back to the solution space (such as by an approximate inverse or by the transpose of the forward model). The previous estimated solution is then updated based on the back-transformed data-mismatch as well as an optional regularization term or prior term.

The present invention attempts to solve the problem of accelerating image reconstruction and/or of improving image quality by learning about the data fidelity (i.e., "data-fit") and image update functions from training data without a need for physical or statistical noise models or analytical algorithm design. By way of example, in one implementation an unrolled optimization architecture is employed for image reconstruction, e.g., in medical imaging such as CT, PET, SPECT, and MR, where the data fidelity computation and/or the image update computation include one or more trained neural networks. In this context, one or both of the data fidelity step and the image update step are allowed to learn about the data statistics or optimal numerical routines from training data through neural network models. In certain implementations, skip layer connections may be made in the architecture. The proposed architecture is more flexible than conventional architectures and may result in improved image quality or require fewer iterations, consequently accelerating reconstruction.

As used herein, the term "data-fit" may be understood to mean the reconstruction cost function term that defines the level of consistency of an estimated solution or set of variables (e.g., a reconstructed image) with the measured data (e.g., a sinogram). For example, a data-fit term in a CT context may be the weighted least squares error between the measured sinogram and the reprojection of an estimated reconstructed image. An iterative update calculation or step, as used herein, may be understood to refer to an iterative update of an estimated solution based on a preceding data-fit operation, where the iterative update is designed to enhance consistency of the estimated solution with the measured data.

With the preceding introductory comments in mind, some generalized information is provided both to indicate general context of the present disclosure and to facilitate understanding and explanation of certain of the technical concepts described herein.

For example, as noted above, trained neural networks may be employed with respect to one or both a data-fit (i.e., data fidelity) step and/or an image update step of an iterative image reconstruction process. Neural networks as discussed herein may encompass deep neural networks, fully connected networks, convolutional neural networks (CNNs), perceptrons, auto encoders, recurrent networks, wavelet filter banks based neural networks, or other neural network architectures. These techniques may also be referred to herein as deep learning techniques, though this terminology may also be used specifically in reference to the use of deep neural networks, which is a neural network having a plurality of layers.

As discussed herein, deep learning techniques (which may also be known as deep machine learning, hierarchical learning, or deep structured learning) are a branch of machine learning techniques that employ mathematical representations of data and artificial neural networks for learning. By way of example, deep learning approaches may be characterized by their use of one or more processor-implemented routines to extract or model high-level abstractions of a type of data of interest. This may be accomplished using one or more processing layers, with each layer typically corresponding to a different level of abstraction and, therefore potentially employing or utilizing different aspects of the initial data or outputs of a preceding layer (i.e., a hierarchy or cascade of layers) as the target of the processes, operations, or weightings of a given layer. In an image processing or reconstruction context, this may be characterized as different layers corresponding to the different feature levels or resolution in the data.

In general, the processing from one representation space to the next-level representation space can be considered as one 'stage' of the reconstruction process. Each stage of the reconstruction can be performed by separate neural networks or by different parts of one larger neural network. For example, as discussed herein, respective deep learning networks (e.g., trained neural network) may be used to perform data-fit operations or calculations and image update operations or calculations in an iterative step of a reconstruction process.

As discussed herein, as part of the initial training of deep learning processes to solve a particular problem, training data sets may be employed that have known initial values (e.g., input images, projection data, emission data, magnetic resonance data, and so forth) and known or desired values for a final output of the deep learning process. The training of a single stage may have known input values corresponding to one representation space and known output values corresponding to a next-level representation space. In this manner, the deep learning processes may process (in a supervised or guided manner) the known or training data sets until the mathematical relationships between the initial data and desired output(s) are discerned and/or the mathematical relationships between the inputs and outputs of each layer are discerned and characterized. Similarly, separate validation data sets may be employed in which both the initial and desired target values are known, but only the initial values are supplied to the trained deep learning processes, with the outputs then being compared to the outputs of the deep learning algorithm to validate the prior training and/or to prevent over-training.

With the preceding in mind, FIG. 1 schematically depicts an example of an artificial neural network 50 that may be trained as a deep learning model as discussed herein. In this example, the network 50 is multi-layered, with the multiple layers including an input layer 54 (configured to receive input data 52), hidden layers 58A, 58B, and so forth, and an output layer 60 configured to generate an output 66, which in some contexts may be compared to a target output 64 (e.g., a training target). Each layer, in this example, is composed of a plurality of "neurons" or nodes 56. The number of neurons 56 may be constant between layers or, as depicted, may vary from layer to layer. Neurons 56 at each layer generate respective outputs that serve as inputs to the neurons 56 of the next hierarchical layer. In practice, a weighted sum of the inputs with an added bias is computed to "excite" or "activate" each respective neuron of the layers according to an activation function, such as rectified linear unit (ReLU), sigmoid function, hyperbolic tangent function, or otherwise specified or programmed. The outputs 66 of the output layer 60 constitute the network output which, in conjunction with a target output 64, may be used to compute some loss or error function 62 that can be backpropagated to guide the network training.

The loss or error function 62 measures the difference between the network output and the training target. In certain implementations, the loss function may be the mean squared error (MSE) of the voxel-level values, Fourier-domain values, sinogram values, line-integral values, attenuated line-integral values, partial-line-integral values, or attenuated partial line-integral values and/or may account for differences involving other image features, such as image gradients or other image statistics. Alternatively, the loss function 62 could be defined by other metrics associated with the particular task in question, such as a softmax function.

To facilitate explanation of the present tomographic reconstruction approach using deep learning techniques, the present disclosure primarily discusses these approaches in the context of a CT or C-arm system. However, it should be understood that the following discussion may also be applicable to other image modalities and systems including, but not limited to, PET, SPECT, multi-spectral CT, phase-contrast imaging, and MRI, as well as to non-medical contexts or any context where tomographic reconstruction is employed to reconstruct an image.

Figure 2:
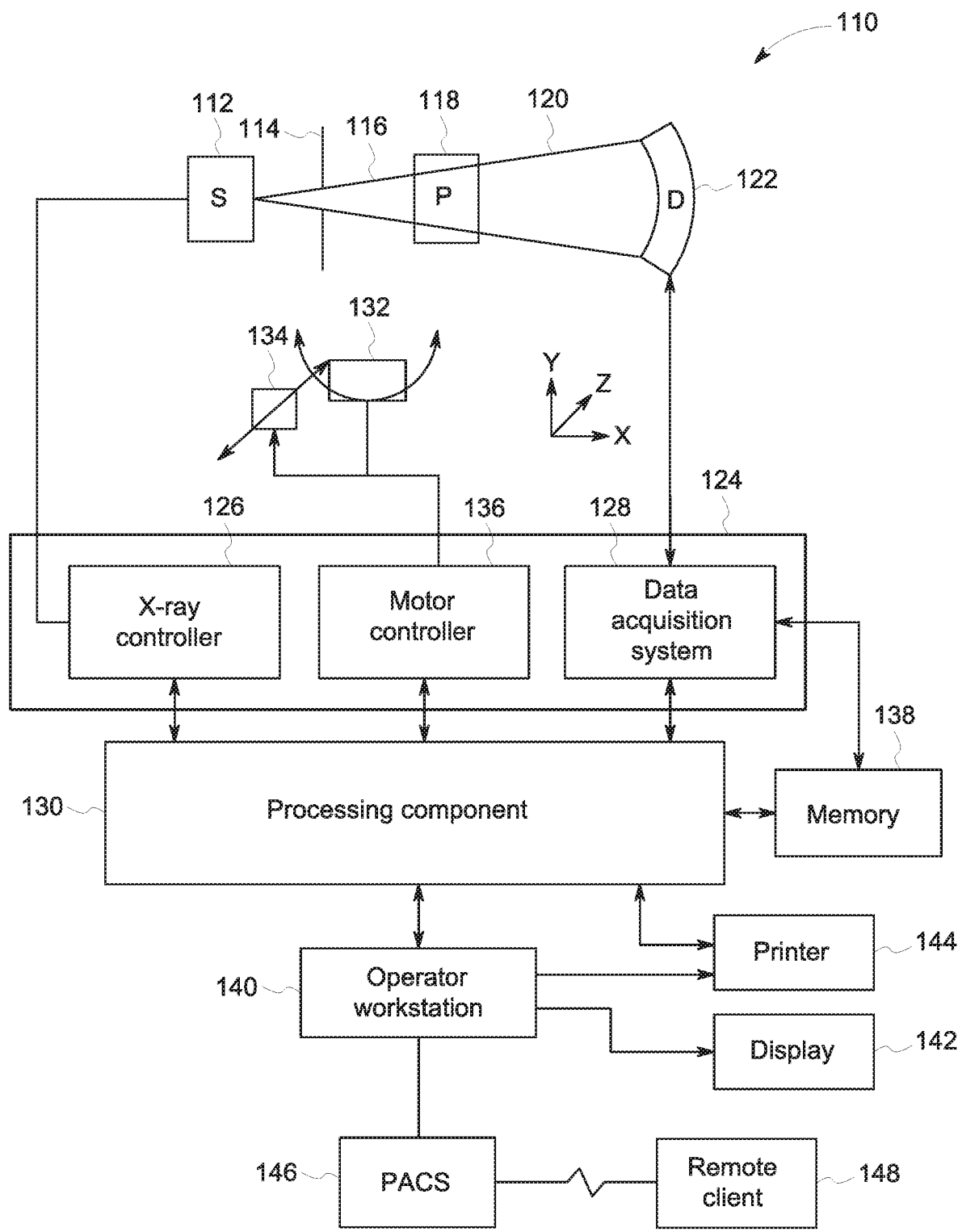
FIG. 2 is a block diagram depicting components of a computed tomography (CT) imaging system, in accordance with aspects of the present disclosure.

With this in mind, an example of an imaging system 110 (i.e., a scanner) is depicted in FIG. 2. In the depicted example, the imaging system 110 is a CT imaging system designed to acquire scan data (e.g., X-ray attenuation data) at a variety of views around a patient (or other subject or object of interest) and suitable for performing image reconstruction using tomographic reconstruction techniques. In the embodiment illustrated in FIG. 2, imaging system 110 includes a source of X-ray radiation 112 positioned adjacent to a collimator 114. The X-ray source 112 may be an X-ray tube, a distributed X-ray source (such as using solid-state electron emitters, thermionic electron emitters, or dispenser-cathode electron emitters) or any other source of X-ray radiation suitable for the acquisition of medical or other images. Conversely, in a PET or SPECT embodiments, a toroidal radiation detector may be provided and a radioactive tracer is used as a radiation source. In the case of MRI, the measurements are samples in Fourier space and can either be applied directly as the input to the neural network or can first be converted to line integrals.

In the depicted example, the collimator 114 shapes or limits a beam of X-rays 116 that passes into a region in which a patient/object 118, is positioned. In the depicted example, the X-rays 116 are collimated to be a cone-shaped beam, i.e., a cone-beam, that passes through the imaged volume. A portion of the X-ray radiation 120 passes through or around the patient/object 118 (or other subject of interest) and impacts a detector array, represented generally at reference numeral 122. Detector elements of the array produce electrical signals that represent the intensity of the incident X-rays 120. These signals are acquired and processed to reconstruct images of the features within the patient/object 118.

Source 112 is controlled by a system controller 124, which furnishes both power, and control signals for CT examination sequences, including acquisition of two-dimensional localizer or scout images used to identify anatomy of interest within the patient/object for subsequent scan protocols. In the depicted embodiment, the system controller 124 controls the source 112 via an X-ray controller 126 which may be a component of the system controller 124. In such an embodiment, the X-ray controller 126 may be configured to provide power and timing signals to the X-ray source 112.

Moreover, the detector 122 is coupled to the system controller 124, which controls acquisition of the signals generated in the detector 122. In the depicted embodiment, the system controller 124 acquires the signals generated by the detector using a data acquisition system 128. The data acquisition system 128 receives data collected by readout electronics of the detector 122. The data acquisition system 128 may receive sampled analog signals from the detector 122 and convert the data to digital signals for subsequent processing by a processor 130 as discussed below. Alternatively, in other embodiments the digital-to-analog conversion may be performed by circuitry provided on the detector 122 itself. The system controller 124 may also execute various signal processing and filtration functions with regard to the acquired image signals, such as for initial adjustment of dynamic ranges, interleaving of digital image data, and so forth.

In the embodiment illustrated in FIG. 2, system controller 124 is coupled to a rotational subsystem 132 and a linear positioning subsystem 134. The rotational subsystem 132 enables the X-ray source 112, collimator 114 and the detector 122 to be rotated one or multiple turns around the patient/object 118, such as rotated primarily in an x,y-plane about the patient. It should be noted that the rotational subsystem 132 might include a gantry or C-arm upon which the respective X-ray emission and detection components are disposed. Thus, in such an embodiment, the system controller 124 may be utilized to operate the gantry or C-arm.

The linear positioning subsystem 134 may enable the patient/object 118, or more specifically a table supporting the patient, to be displaced within the bore of the CT system 110, such as in the z-direction relative to rotation of the gantry. Thus, the table may be linearly moved (in a continuous or step-wise fashion) within the gantry to generate images of particular areas of the patient 118. In the depicted embodiment, the system controller 124 controls the movement of the rotational subsystem 132 and/or the linear positioning subsystem 134 via a motor controller 136.

In general, system controller 124 commands operation of the imaging system 110 (such as via the operation of the source 112, detector 122, and positioning systems described above) to execute examination protocols and to process acquired data. For example, the system controller 124, via the systems and controllers noted above, may rotate a gantry supporting the source 112 and detector 122 about a subject of interest so that X-ray attenuation data may be obtained at one or more views relative to the subject. In the present context, system controller 124 may also include signal processing circuitry, associated memory circuitry for storing programs and routines executed by the computer (such as routines for performing tomographic reconstruction techniques described herein), as well as configuration parameters, image data, and so forth.

In the depicted embodiment, the image signals acquired and processed by the system controller 124 are provided to a processing component 130 for reconstruction of images in accordance with the presently disclosed techniques. The processing component 130 may be one or more general or application-specific microprocessors. The data collected by the data acquisition system 128 may be transmitted to the processing component 130 directly or after storage in a memory 138. Any type of memory suitable for storing data might be utilized by such an exemplary system 110. For example, the memory 138 may include one or more optical, magnetic, and/or solid state memory storage structures. Moreover, the memory 138 may be located at the acquisition system site and/or may include remote storage devices for storing data, processing parameters, and/or routines for tomographic image reconstruction, as described below.

The processing component 130 may be configured to receive commands and scanning parameters from an operator via an operator workstation 140, typically equipped with a keyboard and/or other input devices. An operator may control the system 110 via the operator workstation 140. Thus, the operator may observe the reconstructed images and/or otherwise operate the system 110 using the operator workstation 140. For example, a display 142 coupled to the operator workstation 140 may be utilized to observe the reconstructed images and to control imaging. Additionally, the images may also be printed by a printer 144 which may be coupled to the operator workstation 140.

Further, the processing component 130 and operator workstation 140 may be coupled to other output devices, which may include standard or special purpose computer monitors and associated processing circuitry. One or more operator workstations 140 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

It should be further noted that the operator workstation 140 may also be coupled to a picture archiving and communications system (PACS) 146. PACS 146 may in turn be coupled to a remote client 148, radiology department information system (RIS), hospital information system (HIS) or to an internal or external network, so that others at different locations may gain access to the raw or processed image data.

While the preceding discussion has treated the various exemplary components of the imaging system 110 separately, these various components may be provided within a common platform or in interconnected platforms. For example, the processing component 130, memory 138, and operator workstation 140 may be provided collectively as a general or special purpose computer or workstation configured to operate in accordance with the aspects of the present disclosure. In such embodiments, the general or special purpose computer may be provided as a separate component with respect to the data acquisition components of the system 110 or may be provided in a common platform with such components. Likewise, the system controller 124 may be provided as part of such a computer or workstation or as part of a separate system dedicated to image acquisition.

The system of FIG. 2 may be utilized to acquire X-ray projection data for a variety of views about a region of interest of a patient to reconstruct images of the imaged region using the scan data. Projection (or other) data acquired by a system such as the imaging system 110 may be reconstructed as discussed herein to perform a tomographic reconstruction.

With the preceding background and context discussion in mind, the present disclosure relates to an image reconstruction approach with favorable properties in terms of noise reduction, spatial resolution, detail preservation and computational complexity. The disclosed technique may include use of an unrolled optimization architecture for image reconstruction, e.g., in medical imaging such as CT, PET, SPECT, and MR, where the data fidelity computation and/or the image update computation include one or more trained neural networks.

Figure 3:
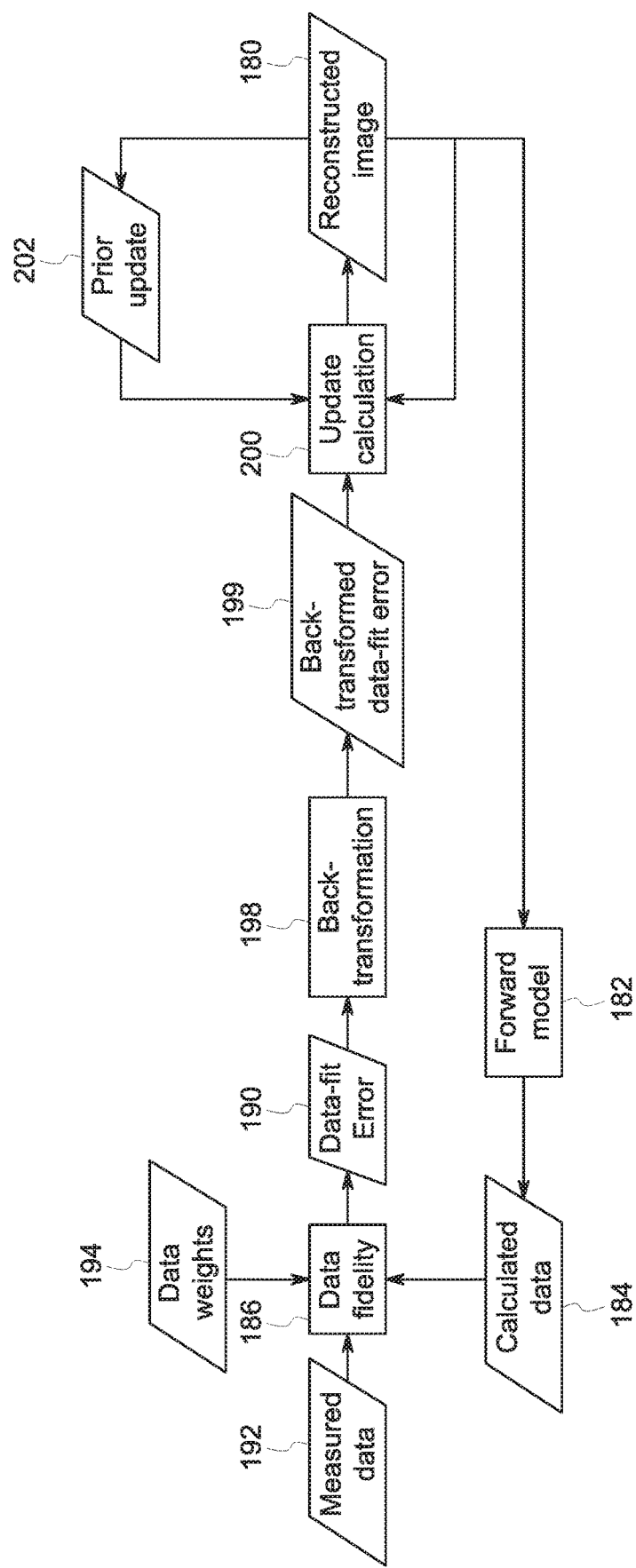
FIG. 3 depicts a conventional looped iterative reconstruction process.

Prior to describing aspects of the present disclosure, to facilitate explanation FIG. 3 depicts a process flow of a conventional iterative optimization or reconstruction process. In accordance with this conventional approach, in a given iteration loop an estimate of a reconstructed image 180 is passed through a forward model (step 182) to derive a set of calculated data 184. A data fidelity (i.e., data-fit) calculation (step 186) computes an error term 190 (i.e., a data-fit error term) between the calculated data 184 and the measured data 192 and weights the error 190 based on data weights 194, e.g.:

$$\text{data-fit\_error} = \text{data weights}*(\text{meas\_data}-\text{calc\_data}). \quad (1)$$

The data-fit error 190 is then back-transformed (step 198) (e.g., backprojected) to the image domain to generate a backtransformed data-fit error term 199. The reconstructed image 180 is then updated (step 200) based on the original image (i.e., the reconstructed image at the beginning of the current iteration loop), the backtransformed data-fit error term 199 and a prior or regularization term (i.e., prior update 202), e.g.:

$$\text{new\_image} = \text{old\_image} + \text{backtransformed}(\text{data-fit\_error}) + \text{prior update}. \quad (2)$$

This process may be repeated until some termination criterion is reached, such as obtaining a reconstructed image that satisfactorily represents the measured data.

The present invention accelerates image reconstruction and/or improves image quality (such as image noise, contrast-to-noise ratio, spatial resolution, quantitative accuracy, and detectability in reconstructed images). This may be accomplished by the use of deep learning models (e.g., neural networks) that learn about the data fidelity and image update functions from training data without a need for physical or statistical noise models or analytical algorithm design. In particular, in accordance with certain aspects the image reconstruction is represented as an unrolled (i.e. non-looped) process, in which all the computation steps occur in a fixed sequence without repetitions, and in which the data fidelity computation (i.e., data-fit calculation 186) and/or the image update computation (i.e., update calculation 200) incorporate a neural network. Due to the unrolled nature of the iterated steps, different neural networks or models may be employed at different stages or steps of the process so as to optimize the performance of the reconstruction process. Alternatively, the same neural network or model may be used at multiple (or all) repeated steps (e.g., data-fit steps and/or image update steps) of the unrolled process. In contrast, an iterated process that is not unrolled (i.e., is looped) repeats the same operation each iteration.

By way of example, in a current approach the data fidelity (i.e., data-fit) calculation and the image update step may learn or be taught using the data statistics or optimal numerical processes, such as by applying training data through neural network models. Further, skip layer connections may be made in the present unrolled architecture that allows data from iterations other than the immediately preceding iteration to be available or used by a present iterative or repeated block. The present architecture is flexible compared to conventional architectures and may result in improved image quality and/or require fewer iterations, consequently accelerating reconstruction.

Figure 4:
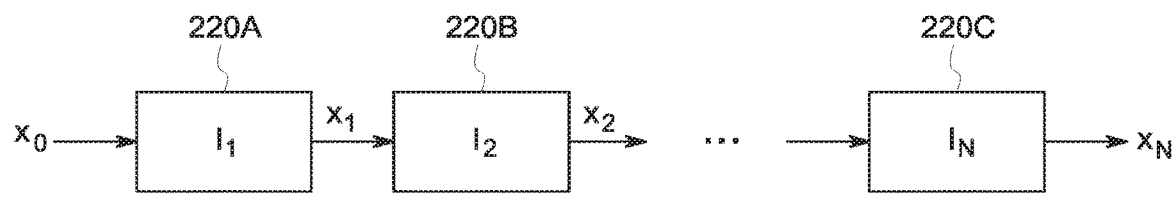
FIG. 4 depicts a high-level view of an unrolled iterative reconstruction process, in accordance with aspects of the present disclosure.

With this in mind, and turning to FIG. 4, an unrolled (i.e., non-looped) optimization architecture is depicted which consists of N iterative or repeated process steps 220, $I_1, \ldots, I_N$. The input to the $i^{th}$ iterative step (i.e., iteration) $I_i$ is a reconstructed image $x_{i-1}$ reconstructed in the preceding iteration, and the output is the reconstructed image $x_i$ reconstructed in the present iteration. As used herein, reconstructed images generated by an iterative step 220 that are not the final or terminal iterative step may be denoted as intermediate images. The input to the entire neural network is an initial image $x_0$, and the output $x_N$ represents a final (i.e., non-intermediate) reconstructed image. During the training of the neural network, the output reconstructed image (i.e., $x_N$) is compared against a reference image. For example, in one implementation the label of training data, based on a loss function, and the parameters or weights of the iterative steps are determined iteratively by minimizing the loss function. The iterative steps 220 may share the parameters to train. Alternatively, each iterative step 220 in the unrolled sequence may have its own parameters independent of the other iterative steps.

Figure 5:
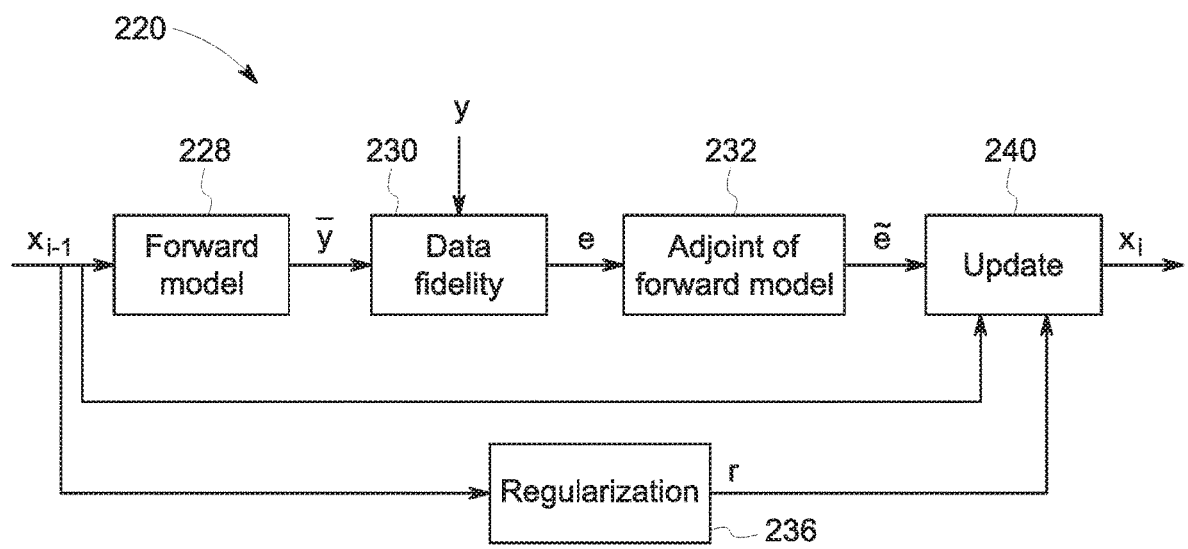
FIG. 5 depicts a process flow within an iteration step, in accordance with aspects of the present disclosure.
Figure 6:
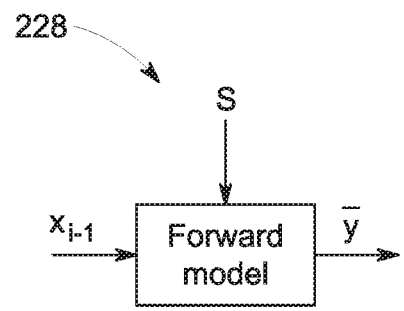
FIG. 6 depicts inputs and outputs to a forward model step, in accordance with aspects of the present disclosure.

Turning to FIG. 5, a process and data flow of each iterative step 220 in an unrolled sequence is illustrated. In the depicted example, within a given iterative step 220 the forward model 228 is used to calculate the predicted (or calculated) data y based on an intermediate image $x_{i-1}$ from the preceding iterative step 220 (or $x_0$ if the initial iterative step). The forward model 228 may be a linear or affine transformation. Turning briefly to FIG. 6, the forward model 228 may have an additional input, such as background estimates s in PET or a scatter estimate in CT.

Figure 7:
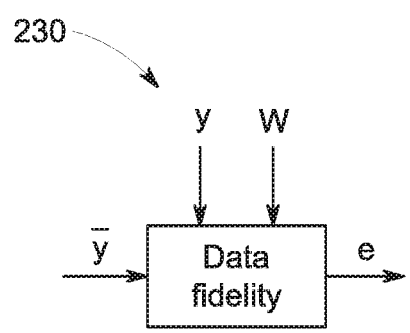
FIG. 7 depicts inputs and outputs to a data fidelity step, in accordance with aspects of the present disclosure.

Turning back to FIG. 5, the data fidelity step 230 (e.g., data fidelity calculator) generates a data-domain error-measure e based on the predicted (or calculated) data y and the measured data y. Turning briefly to FIG. 7, the data fidelity step 230 may have an additional input such as data (co) variance estimates (or weights) W. In conventional iterative reconstruction, the data fidelity step 230 may be implemented by taking the (weighted) difference between the predicted and the measured data, that is, $e = y - \bar{y}$, or $e = W(y - \bar{y})$, or by calculating the gradient of the Poisson log-likelihood. In contrast, in accordance with certain present implementations the data fidelity step 230 may be modeled using a trained neural network with one or more layers. Further, as noted above, the trained neural network used to evaluate data fidelity may differ for different iterative blocks 220 in the unrolled sequence so as to improve the computational efficiency and/or image quality of the process. For example, in certain implementations the parameters (or weights) of the trained neural networks used to perform a data fit operation may be different between iterative steps 220 or may be shared by all the iterative steps 220.

Turning back to FIG. 5, the adjoint (or transpose or backprojection) of the forward model maps (step 232) data-domain error-measure (or error term) e into image-domain error-measure (or image domain error term) ẽ. The adjoint step 232 may also be modeled using a trained neural network with one or more layers.

The regularization step 236 generates the output (prior update) r by incorporating prior-information independent of measured-data. The regularization step 236 may calculate the gradient of a regularization (or penalty) function as in conventional regularized (or penalized) image reconstruction, or may be modeled using a trained neural network as in unrolled optimization with deep priors.

Figure 8:
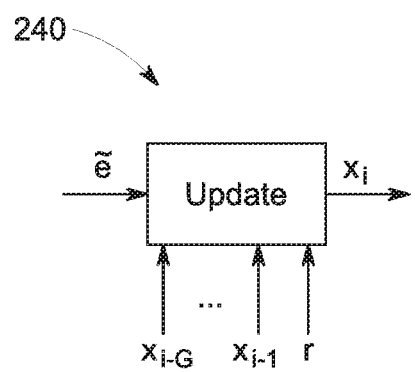
FIG. 8 depicts inputs and outputs to an image update step, in accordance with aspects of the present disclosure.

The image update step 240 combines the image-domain error-measure ẽ, the regularization-step output (or prior update) r, and the intermediate image $x_{i-1}$ to generate the next intermediate image $x_i$. Conventionally, the image update step (e.g., update calculation step 200 of FIG. 3) calculates a linear transformation, e.g., $x_i = x_{i-1} \mp \tilde{e} \mp r$ (e.g., an additive or subtractive process, or in other cases may include a multiplicative process). In contrast, in accordance with the present disclosure, the image update step 240 itself may be modeled using a trained neural network with one or more layers, and may thereby provide results that are not limited to linear transformations, but may incorporate more complex transformations based on the weights and training associated with the neural network(s) used for the image update processes. Further, the present image update step 240 may have additional inputs $x_{i-G}, x_{i-G+1}, \ldots, x_{i-2}$ (i.e., other preceding intermediate images) from previous iterative steps 220 as shown in FIG. 8. These skip layer connections provide additional flexibility to the entire network with a potential of further improvement in image quality and reconstruction speed.

In certain implementations, the image update step 240 may calculate $x_i = P(x_{i-1}, \tilde{e}, r)$ where $P( )$ is the output of a trained neural network whose inputs include $x_{i-1}$ and optionally other intermediate images from previous iterative steps. In such an implementation, the neural network may essentially learn about the preconditioner from training data. For comparison, some existing approaches in literature use $x_i = x_{i-1} + \tilde{e} + P(r)$, which is limited to using a neural network to compute a regularization or prior update, but does not fundamentally change the update equation or the preconditioning. Further, as noted above, the trained neural network used to perform the image update step may differ for different iterative blocks 220 in the unrolled sequence so as to improve the computational efficiency and/or image quality of the process. For example, in certain implementations the parameters (or weights) of the trained neural networks used to perform a data fit operation may be different between iterative steps 220 or may be shared by all the iterative steps 220.

Figure 9:
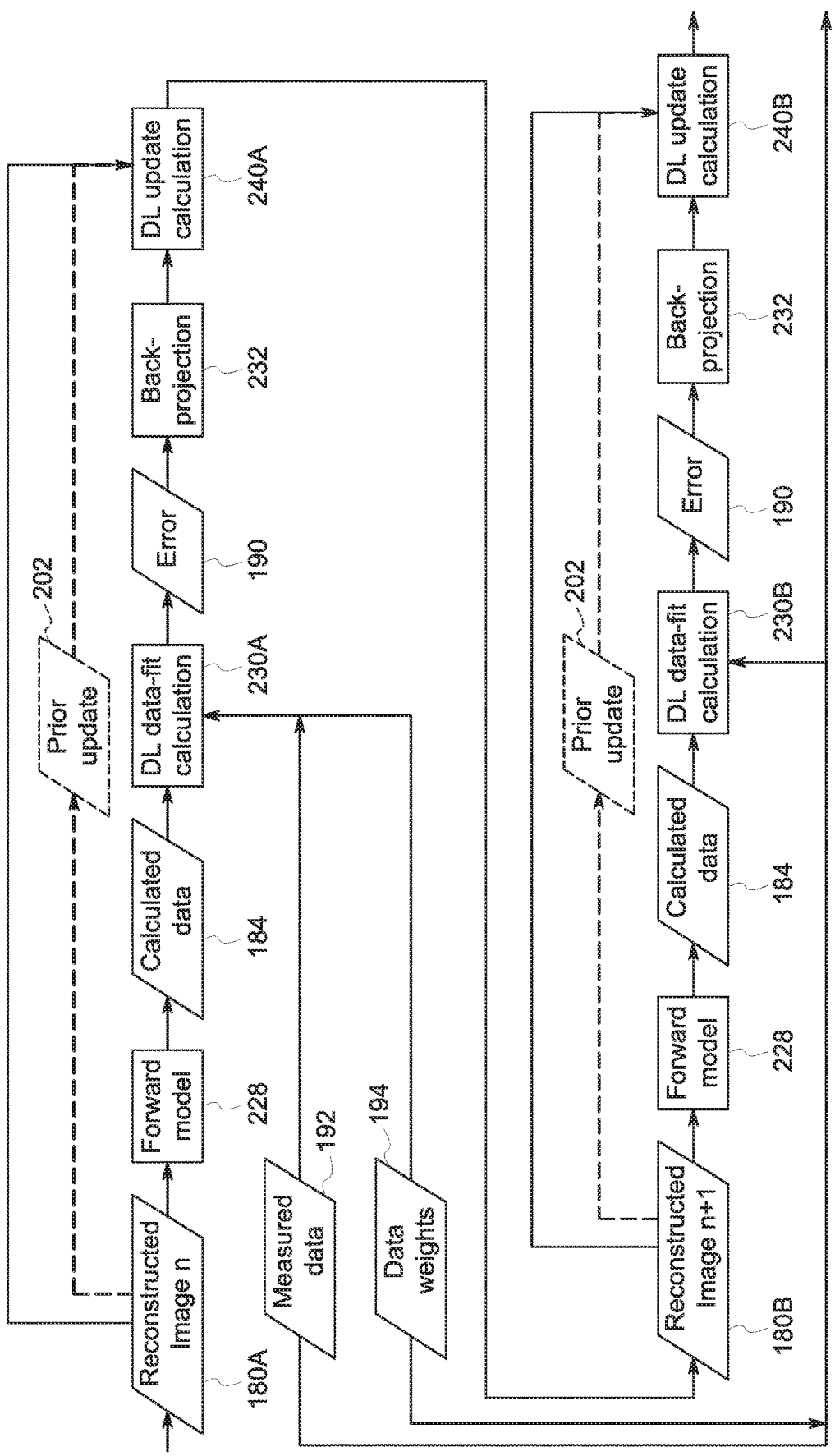
FIG. 9 depicts an example of an unrolled process flow of two iteration steps in an image reconstruction process, in accordance with aspects of the present disclosure.

With the preceding discussion in mind, FIG. 9 depicts a process flow of two iterative steps in sequence that may be part of a reconstruction process for an imaging system (e.g., a CT, MR, PET, or SPECT imaging system). As noted above, one aspect of the unrolled iterative processes described herein is the possibility of having different iterative stages or steps that differ from other iterative stages or steps (such as by the application or use of neural networks trained for image update steps or data fidelity steps that differ depending on the iterative stage or step). This is in contrast to looped iterative models where the same steps or processes are performed in an invariant manner in each iteration.

With this in mind, the example process shown in FIG. 9 is shown as starting with an initial reconstructed image 180A (either an initial reconstruction or an intermediate image in the process) that is an input to a forward model 228, which in turn outputs a set of calculated data 184 corresponding to the data measurements that would have produced by the reconstructed image 180A input to the forward model 228. This set of calculated data 184, in the depicted example, is input to a deep learning (DL) data-fit calculation step 230A (such as using a trained data-fit neural network) configured to perform a data-fit assessment between the actual measured data 192 and the calculated data 184. The DL data-fit calculation step 230 may also receive as inputs one or more data weights 194. As noted herein, the DL data-fit calculation step 230A may perform non-linear operations (i.e., is not limited to additive and subtractive processes) in assessing the fit of the calculated data 184 to the measured data 192. The DL data-fit calculation step 230 may provide as an output a data-fit error term 190 indicative of a discrepancy between the calculated data 184 to the measured data 192.

In the depicted example the error term 190, which is not in the image domain in this example, is backtransformed (step 232) to the image domain and provided as an input to a deep learning (DL) image update step 240A (such as using a trained neural network) configured to update the input reconstructed image 180A based on the back-projected data-fit error. Thus, in practice the DL image update step 240 may receive as inputs the backtransformed data-fit error term and the input reconstructed image 180. In addition, the DL image update step 240 may also receive as an input a prior update 202 (i.e., a regularizer term). Alternatively, the DL image update step 240 (e.g., trained image update neural network) may be trained to derive the prior update term itself as part of its operation, in which case the prior update 202 is not provided to the DL image update step 240 as an input. Further, unlike conventional approaches, the DL image update step 240 may also receive as inputs other data, such as other reconstructed or intermediate images generated in the reconstruction process (e.g., an intermediate image or images generated more than one iterative step prior).

As noted in the preceding discussion, the DL image update step 240 may perform non-linear operations (i.e., is not limited to additive and subtractive processes) in performing an update to the input reconstructed image 180. The DL image update step 240 may provide as an output a reconstructed image 180B (i.e., an intermediate image) which serves as an input to the next sequential iterated step in which comparable steps are performed. Of note however, and as discussed herein, due to the unrolled (i.e., non-looped) aspect of the present disclosure, the deep learning models (e.g., trained neural networks) employed in different iterative steps may be different and/or optimized for their placement in the sequence. That is, a DL data-fit calculation step 230A performed in one iterative step may differ (e.g., employ different weights, a different number of layers, different node or layer interconnections, and so forth) from a DL data-fit calculation step 230B performed in a different iterative step. Similarly, a DL image update step 240A performed in one iterative step may differ (e.g., employ different weights, a different number of layers, different node or layer interconnections, receive different or additional image or data inputs, and so forth) from a DL image update step 240B performed in a different iterative step.

Technical effects of the invention include, but are not limited to, performing unrolled iterative reconstruction of image data. Such approaches may include use of neural networks for the data fidelity and/or image update steps to provide flexibility and to allow the network to learn about accurate data statistics and optimal numerical routines from training data, resulting in improved image quality and accelerated reconstruction for various imaging modalities including CT, PET and MR.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for reconstructing an image, comprising:
receiving a scan data input from a scan device;
processing the scan data input to generate a final reconstructed image using a sequence of processing steps, wherein each processing step comprises:
applying a forward model to an input image provided as an input to the respective processing step to generate calculated data;
providing the calculated data and measured data as inputs to a data fidelity calculator that outputs an error term;
backtransforming the error term to generate an image domain error term; and
providing at least the image domain error term and the input image as inputs to an image update neural network to generate a next reconstructed image as input to a next processing step.

2. The method of claim 1, further comprising providing data weights as inputs to the data fidelity calculator.

3. The method of claim 1, wherein the data fidelity calculator comprises a data fidelity neural network trained to receive as inputs at least the calculated data and measured data and to output the error term.

4. The method of claim 3, wherein the data fidelity neural network further receives one or more data weights as inputs.

5. The method of claim 3, wherein the error term generated by the data fidelity neural network is a non-linear transform based on the inputs to the data fidelity neural network.

6. The method of claim 3, wherein the respective data fidelity neural network used in different processing steps of the sequence of non-looped processing steps is one or more of trained differently, employs different weights, or receives different types of inputs.

7. The method of claim 1, wherein the input to the image update neural network further comprises a prior update.

8. The method of claim 1, wherein the image update neural network is trained to derive a prior update from the input image and to use the prior update in generating the next reconstructed image and does not receive the prior update as a separate input.

9. The method of claim 1, wherein the input to the image update neural network further comprises other reconstructed images generated during execution of the sequence of non-looped processing steps.

10. The method of claim 1, wherein the next reconstructed image generated by the image update neural network is a non-linear transform based on the inputs to the image update neural network.

11. The method of claim 1, wherein the respective image update neural network used in different processing steps of the sequence of non-looped processing steps is one or more of trained differently, employs different weights, or receives different types of inputs.

12. An imaging system comprising:
a memory encoding processor-executable routines; and
a processing component configured to access the memory and execute the processor-executable routines, wherein the routines, when executed by the processing component, cause the processing component to process scan data generated by the imaging system to generate a final reconstructed image using a sequence of processing steps, wherein each processing step comprises:
applying a forward model to an input image provided as an input to the respective processing step to generate calculated data;
providing the calculated data and measured data as inputs to a data fidelity neural network trained to output an error term;
backtransforming the error term to generate an image domain error term; and
providing at least the image domain error term and the input image as inputs to an image update neural network to generate a next reconstructed image as input to a next processing step.

13. The imaging system of claim 12, wherein the respective data fidelity neural network used in different processing steps of the sequence of non-looped processing steps is one or more of trained differently, employs different weights, or receives different types of inputs.

14. The imaging system of claim 12, wherein the image update neural network is trained to derive a prior update from the input image and to use the prior update in generating the next reconstructed image and does not receive the prior update as a separate input.

15. The imaging system of claim 12, wherein the input to the image update neural network further comprises other reconstructed images generated during execution of the sequence of non-looped processing steps.

16. The imaging system of claim 12, wherein the respective image update neural network used in different processing steps of the sequence of non-looped processing steps is one or more of trained differently, employs different weights, or receives different types of inputs.

17. A method for reconstructing an image, comprising:
receiving a scan data input from a scan device;
processing the scan data input to generate a final reconstructed image using a sequence of processing steps, wherein each processing step comprises:
applying a forward model to an input image provided as an input to the respective processing step to generate calculated data;
providing the calculated data and measured data as inputs to a data fidelity neural network trained to output an error term;
backtransforming the error term to generate an image domain error term; and providing at least the image domain error term and the input image as inputs to an image update routine to generate a next reconstructed image as input to a next processing step.

18. The method of claim 17, wherein the respective data fidelity neural network used in different processing steps of the sequence of non-looped processing steps is one or more of trained differently, employs different weights, or receives different types of inputs.

19. The method of claim 17, wherein the image update routine comprises an image update neural network trained to receive as inputs at least the image domain error term and the input image.

20. The method of claim 19, wherein the image update neural network is trained to derive a prior update from the input image and to use the prior update in generating the next reconstructed image and does not receive the prior update as a separate input.

21. The method of claim 19, wherein the respective image update neural network used in different processing steps of the sequence of non-looped processing steps is one or more of trained differently, employs different weights, or receives different types of inputs.

* * * * *